No. 749,436. PATENTED JAN. 12, 1904.
L. DE FOREST.
WIRELESS TELEGRAPH RANGE FINDER.
APPLICATION FILED JUNE 17, 1903.
NO MODEL.

WITNESSES:
INVENTOR
Lee de Forest
BY H. L. Reynolds
his ATTORNEY

No. 749,436. Patented January 12, 1904.

UNITED STATES PATENT OFFICE.

LEE DE FOREST, OF NEW YORK, N. Y.

WIRELESS-TELEGRAPH RANGE-FINDER.

SPECIFICATION forming part of Letters Patent No. 749,436, dated January 12, 1904.

Application filed June 17, 1903. Serial No. 161,890. (No model.)

*To all whom it may concern:*

Be it known that I, LEE DE FOREST, a citizen of the United States, and a resident of the city, county, and State of New York, have invented certain new and useful Improvements in Wireless-Telegraph Range-Finders, of which the following is a specification.

My invention relates to an improvement in wireless-telegraph receiving devices whereby an indication of the distance to the transmitting apparatus may be had.

The scope of my invention may be determined by the specification and claims hereunto annexed.

The drawings annexed hereunto show my invention embodied in simple forms of apparatus, such as are now preferred by me.

Figure 1:
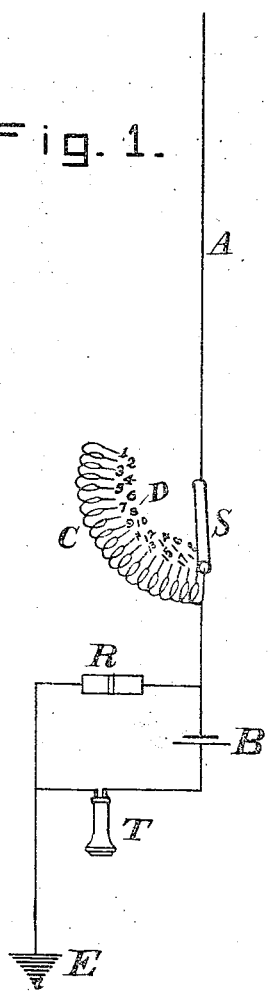
Figure 2:
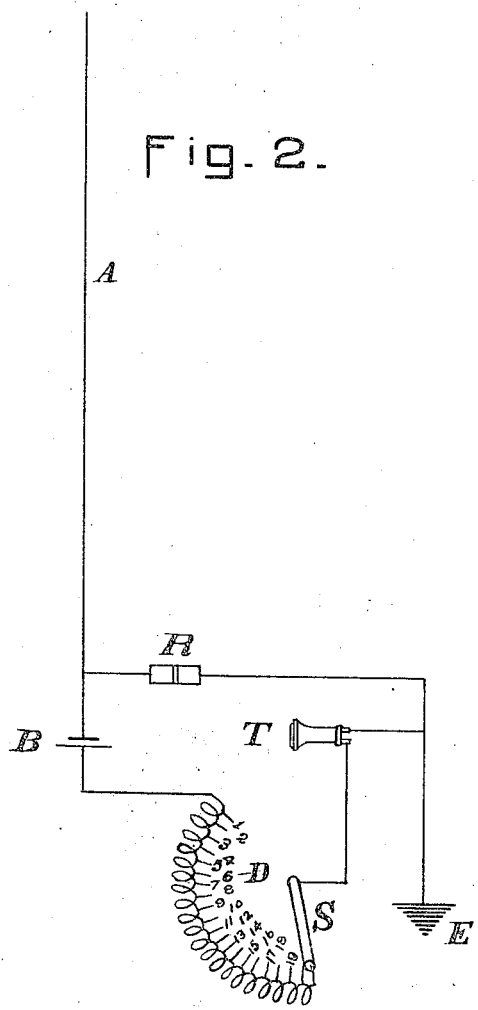

Figures 1 and 2 each show a receiving apparatus embodying my invention, but slightly differing from each other.

With many forms of wireless-telegraph receiving apparatus the intensity of the action of the aerially-received waves upon the indicating mechanisms bears a definite relation to the distance of the station from which they were emitted, it being presumed that the intensity of radiation remains constant. If with such a receiving apparatus means be provided for measuring or indicating the intensity of the impulses received, and the intensity of radiation being known, the separation of the transmitting and receiving stations may be at least approximately told. I have found that a simple method of doing this is to insert a resistance in the circuit of the current induced by the aerially-received waves until the effect of said received impulses is neutralized or damped down to substantially zero, said resistance being insertible by increments which bear a known ratio to the distance and power of a standard transmitter, the size of these increments having been previously carefully determined for different distances and for transmitting-stations of different power. With this information charted it is possible to quickly approximate the distance from a known station when the power thereof is known. Simple means of this character are shown in Figs. 1 and 2. In these, A represents the collecting conductor or antenna; C, the variable resistance, shown as coils of a rheostat; S, the movable switch of the rheostat, which in Fig. 1 is placed in series with the antenna and the wave-responsive device R, and in Fig. 2 is placed in the local circuit; R, the wave-responsive device, which may be of any suitable type; T, a telephone-receiver or other suitable indicating or translating device; B, the local battery, and E, the earth connection.

In the apparatus shown in Fig. 1 the variable resistance is adapted to be inserted in the aerial circuit between the antenna and the wave-responsive device, in which position the aerially-received impulses are attenuated until they produce no effect upon the wave-responsive device. In the apparatus shown in Fig. 2 the variable resistance is shown as adapted to be inserted in the local circuit, where the result is to render relatively insignificant the changes in the local circuit produced by the aerial impulses upon the wave-responsive device. In either case the exact amount of resistance required to dampen down or neutralize the action of the aerial impulse will be previously determined for given transmitting-stations and given distances and this data be recorded in such form that it may be quickly and readily referred to. This will require the operator to do no figuring, but simply to set and read his instrument and then refer to his chart or table to find the distance which corresponds to the reading. As the height of antenna and length of spark-gap or other conditions which vary the force of radiation must be known, it is presumed that this data is known as to the transmitting-station whose distance it is desired to estimate either by reference to a table giving this data for regular stations or by a message previously sent.

The rheostat or variable resistance employed should preferably be provided with a scale—such, for instance, as is shown at D in the drawings—the same being arranged in any arbitrary manner and serving to indicate units of resistance, upon which the accompanying chart is based.

It is obvious that other forms of apparatus than those shown based upon the same principle may be employed. I do not, therefore, wish to be understood as limiting my invention to the apparatus shown, but to broadly claim all forms of apparatus embodying the same principle which fall within a liberal interpretation of the scope of the claims hereunto annexed.

What I claim is—

1. A distance-indicator for use with wireless-telegraph receiving apparatus, comprising a variable resistance adapted to be inserted in the circuit with the indicating device in quantities having values proportioned to different distances of a transmitter therefrom.

2. A distance-indicator for use with a receiving apparatus in wireless telegraphy, comprising a variable resistance adapted to be employed to counteract the aerially-received impulses and in amounts bearing a definite ratio to the distance and power of a standard transmitter.

3. The combination with a receiving apparatus for wireless telegraphy, of a range-finder comprising means for inserting a resistance variable in amount in series with the wave-responsive device, and a scale indicating the amount of such resistance being used.

4. The combination with a receiving apparatus for wireless telegraphy, of a rheostat and means for cutting the same into the aerial circuit between the antenna and the wave-responsive device.

In testimony whereof I have hereunto affixed my signature, this 10th day of June, 1903, in the presence of two witnesses.

LEE DE FOREST.

Witnesses:
GEORGE W. THOMAS,
H. E. WISE.